Figure 1:
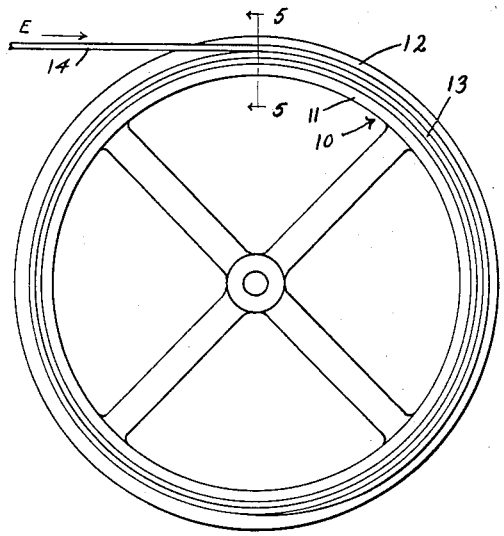

Jan. 9, 1934.  W. G. LERCH  1,943,275
TIRE BEAD
Filed Dec. 29, 1932

INVENTOR.
William G. Lerch
BY
Fay, Oberlin & Fay
ATTORNEYS.

Patented Jan. 9, 1934

1,943,275

UNITED STATES PATENT OFFICE 1,943,275

TIRE BEAD

William G. Lerch, Akron, Ohio, assignor, by direct and mesne assignments, to National-Standard Company, Niles, Mich., a corporation of Michigan Application December 29, 1932
Serial No. 649,286

7 Claims. (Cl. 154—14)

This invention relates to automobile tire beads and the methods of making the same and is in part a continuation of my co-pending application Serial No. 624,041, filed July 22, 1932.

A known method of making tire beads is to assemble the reenforcing wires by arranging them side-by-side in the form of a rubber coated tape and superposing a plurality of said tapes one above the other. The wires in the tape may be held together either by intertwining, or by the use of a weft wire, or solely by the adhesive properties of the rubber composition. In all instances the tape is flat, covered with rubber, and the assembly of tapes seen in cross section forms a quadrilateral figure, usually rectangular, but occasionally of diamond shaped cross section. After the tapes are built up one layer on the other, they are enclosed in a fabric wrapping known as a "flipper strip". Usually a rubber filler of triangular cross section is applied to the inner edge to give the bead the approximately correct shape. This triangular filler is sometimes omitted in making beads for smaller sizes of tires, leaving the bead flat on top. The omission is objectionable as sometimes causing rim cutting.

The difficulty which arises in the prior art, and towards the elimination of which this invention is directed, is that the rubber which surrounds and in part composes the tapes could not pass from the lower part of the bead to the upper, in spite of the fact that immediately before vulcanization takes place the semi-plastic rubber used in the tapes always becomes even more fluid before finally hardening.

Due to this fluid condition of the rubber and its inability to escape from the lower levels of the bead, due to these lower bears being surmounted by tapes of equal width in the upper levels, the wires in the upper tapes have a tendency to rise or "float" to the top of the bead rather than to stay in their proper position further down. This lack of free passage of the rubber within the bead during the semi-fluid condition of the rubber is one factor that makes the use of a filler strip necessary. If the rubber could flow freely within the bead, it would naturally rise up into the apex and at the same time the bead wires would be left pretty much in their original position.

It is to the elimination of these defects and to the attainment of a proper relative positioning of the rubber content of the bead that this invention is directed. Although in the present specification and claims I mention "rubber" and "rubber composition", it is to be understood that these terms are used illustratively and not by way of limitation. For example, various compounds such as balata, and other juices of vegetable origin, as well as synthetic rubber-like compounds are beginning to come into use, and this invention is intended to relate to these also in so far as their properties adapt them to be used in the carrying out of this invention.

One advantage resulting from this arrangement is that it permits the wires which are originally placed at the base of the bead to remain there, which keeps the base of the bead relatively flat and prevents rocking, the final result being a firmer seating of the tire on its rim under strains, and absence of rim cutting.

To the accomplishment of the foregoing and related ends, said invention, then, consists of the means hereinafter fully described and particularly pointed out in the claims; the annexed drawing and the following description setting forth in detail one method and one product constituting, however, but one of various applications of the principle of my invention.

Figure 2:
Figure 3:
Figure 4:
Figure 6:
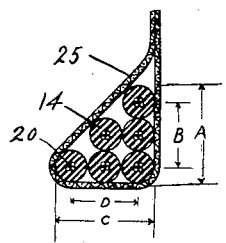
Figure 5:
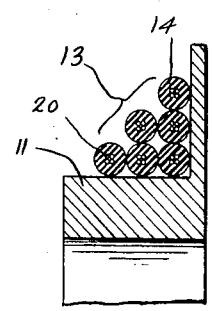
Figure 7:
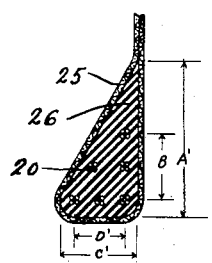

In said annexed drawing Fig. 1 is a side elevation of a bead-forming wheel with a partially formed bead shown thereon; Figs. 2, 3 and 4 are cross sectional views of suitable forms of single cables to be used in forming the bead, Fig. 3 being the preferred form; Fig. 5 is a cross section approximately on the line 5—5 Fig. 1, the bead at this point being complete in cross section; Fig. 6 is a cross section of the bead illustrating the next step in its formation, after removal from the wheel; and Fig. 7 is a cross section corresponding to Fig. 6 but showing the bead as it appears in a finished tire, the fabric layers of the tire proper being omitted.

Fig. 1 illustrates a bead-forming wheel generally indicated by the reference character 10, which comprises, as usual in the art, a face 11 and flange 12, with a bead 13 on the wheel. This bead lacks only about one-half turn of being completed. The cable 14 is wound on the wheel under heavy tension, in successive layers, the cable coming from a source of supply not shown. The direction of travel of the cable to the wheel is indicated by the arrow E. Fig. 5 shows the completed bead in cross section, still on the wheel.

The cable 14, successive turns of which make up the bead, may be in various forms all characterized by relatively central inextensible elements or cores, such as wires surrounded by a coating of rubber or the like. Illustrated forms are shown in cross section in Figs. 2, 3 and 4 in which the wires are indicated by reference characters 20, 20' and 20" respectively, and the composition coating is indicated by the reference characters 21, 21' and 21'' respectively.

In Fig. 6 the cables 14 are in the same relation as in Fig. 5 but the bead has been covered with a flipper strip 25. In this figure the outside height of the triangular bead is indicated by the distance A, and the height from center to center of the cores 20 is indicated by the distance B. Similarly, the outside width of the bead is indicated by the distance C and the width from center to center of the cores 20 of the outermost beads is indicated by the distance D.

In Fig. 7 the bead is shown in the condition it takes in the finished tire, the voids between the cables having been filled and the upper part or apex of the triangle, which is indicated by the reference character 26, being filled with rubber which has been forced up from near the bottom of the bead. It will also be observed that the various wire cores 20 are closer to one another in width but that their height relations are substantially unaltered. The approach of these cores has resulted in a flow of the rubber covering 21 with two effects, first, filling the voids which are seen between the cables in Figs. 5 and 6, and second, forcing rubber up, as mentioned, into the apex 26. By comparison of Fig. 7 with Fig. 6 it will be seen that the distance C' is less than C and D' is less than D. The height B remains the same in both figures, but the height A' is greater than the height A. Due to the fact that the cores in Fig. 6 were considerably separated and also due to the fact that the triangular arrangement of cables caused the greatest amount of rubber composition to be originally placed in the base of the triangle and the quantity of composition originally placed to be diminished as the triangle goes up, free flow of the rubber upwards around the wire cores has been possible, without any forcing of the wire cores upward. The desirable condition is that the greatest amount of the wire reenforcement be near the base of the triangle, and it will be seen that this condition was approximated in the original arrangement shown in Fig. 5, and consequently in changing to the final shape of Fig. 7 no substantial change in or distortion of the original core arrangement, except a slight narrowing at the bottom, has occurred. On the other hand, the difference in cross sectional shape between Fig. 5 and Fig. 7 has been accomplished, as it should be, almost entirely by flow of the rubber composition. As is well known in the industry, and as already mentioned, the rubber composition assumes a highly plastic and practically fluid consistency during the vulcanizing process, just before the final vulcanizing stage. Pressure is applied to the inside of the tire during vulcanizing, and this pressure forces the bead from the cross sectional form of Fig. 6 to that of Fig. 7. Due to the tension of the original winding, the wire cores 20 cannot expand circumferentially; thus the rubber flows around them into the area 26.

It will be seen from the foregoing that I have invented a bead which permits those changes in shape which are necessary to its formation to be made by flow of the rubber without substantially displacing the reenforcing wires and it will be seen that the wires and rubber are relatively so disposed that the wires do not interfere with the flow of the rubber.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:

1. A method of forming tire beads which comprises grouping a plurality of wires in a plurality of groups within a surrounding mass of rubber, and maintaining said wires as groups in substantially their original position while causing the rubber to flow to the top of the bead.

2. A method of making tire beads which comprises placing separate groups of bead wires in triangular cross-sectional arrangement within a triangular cross-sectional mass of rubber of such consistency as to be fluent under pressure, the mass of rubber being considerably in excess of the mass of wires, and applying pressure to narrow said mass of rubber at the bottom of the triangle and so causing flow of rubber to the apex, without substantially altering the height of such groups of wires above the bottom of the triangle.

3. A method of forming a tire bead of generally triangular cross section which comprises first surrounding a plurality of grouped wires with unvulcanized rubber, the mass of rubber being greater than the mass of the wires, placing said rubber and said groups of wires in generally triangular cross-sectional arrangement, then narrowing the base of said bead and thereby moving some of said rubber to the apex of the triangle without removing said wires further from the base.

4. A method of forming a tire bead which comprises placing reenforcing elements in widely-spaced groups, the arrangement of groups being of generally triangular cross section in said bead in a mass of unvulcanized rubber, said rubber also being placed in generally triangular cross-sectional arrangement, narrowing the bases of said triangles and thereby increasing the altitude of said triangle of rubber without increasing the altitude of the triangle of reenforcing elements.

5. A method of forming a tire bead which comprises arranging reenforcing elements in well-separated arrangement in the general position they are to occupy in the finished bead, said reenforcing elements carrying bodies of rubber with them, then changing the cross section of said bead by altering the disposition of the rubber while maintaining the reenforcing elements in approximately original positions.

6. A method of making a tire bead which comprises shaping a collection of groups of relatively circumferentially inert reenforcing elements by surrounding each group with a coating of fluent extendable material, then applying pressure to the article so formed in such a way as to modify the cross-sectional shape of the bead by causing the fluent material to flow past the non-fluent material.

7. A method of forming a tire bead which comprises arranging reenforcing elements with relatively large rubber coverings in the general position they are to occupy in the finished bead, then changing the cross section of the bead by causing greater flow of the rubber than movement of the reenforcing elements.

WILLIAM G. LERCH.